United States Patent
Jung

(10) Patent No.: US 9,690,173 B1
(45) Date of Patent: Jun. 27, 2017

(54) ROTATING MOUNT

(71) Applicant: LG INNOTEK CO., LTD., Seoul (KR)

(72) Inventor: Sung Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/356,944

(22) Filed: Nov. 21, 2016

(30) Foreign Application Priority Data

Dec. 16, 2015 (KR) .................. 10-2015-0180211

(51) Int. Cl.
| | |
|---|---|
| G03B 17/56 | (2006.01) |
| F16M 11/00 | (2006.01) |
| H04N 5/225 | (2006.01) |
| F16M 11/10 | (2006.01) |
| F16M 11/04 | (2006.01) |
| F16M 11/20 | (2006.01) |
| F16M 13/02 | (2006.01) |

(52) U.S. Cl.
CPC ......... *G03B 17/561* (2013.01); *F16M 11/041* (2013.01); *F16M 11/10* (2013.01); *F16M 11/2014* (2013.01); *F16M 13/02* (2013.01); *H04N 5/2252* (2013.01); *F16M 2200/028* (2013.01)

(58) Field of Classification Search
None
See application file for complete search history.

(56) References Cited

U.S. PATENT DOCUMENTS

| 5,632,463 | A * | 5/1997 | Sung ................... F16M 11/126 |
| | | | 248/349.1 |
| 6,042,080 | A * | 3/2000 | Shepherd ............... B60R 11/00 |
| | | | 248/163.1 |
| 9,071,740 | B1* | 6/2015 | Duffy .................. H04N 5/2252 |
| 2006/0124818 | A1* | 6/2006 | Wai ...................... F16M 11/08 |
| | | | 248/349.1 |
| 2007/0297788 | A1* | 12/2007 | Wahl ................... G03B 17/561 |
| | | | 396/419 |
| 2008/0061199 | A1* | 3/2008 | Chen ..................... B60R 11/00 |
| | | | 248/205.8 |
| 2009/0308993 | A1* | 12/2009 | Chang ................... F16B 47/00 |
| | | | 248/176.3 |
| 2010/0116962 | A1* | 5/2010 | Lai ........................ F16M 11/08 |
| | | | 248/393 |
| 2011/0163211 | A1* | 7/2011 | Cicco .................... B60R 11/02 |
| | | | 248/158 |
| 2016/0363837 | A1* | 12/2016 | Kilgore ............. F16M 11/2064 |

FOREIGN PATENT DOCUMENTS

KR    10-2008-0011962    2/2008

OTHER PUBLICATIONS

Korean Office Action dated Dec. 1, 2016 issued in Application No. 10-2015-0180211.

* cited by examiner

*Primary Examiner* — W B Perkey
(74) *Attorney, Agent, or Firm* — KED & Associates, LLP

(57) ABSTRACT

A rotating mount includes an imaging device, a stand cover connected to the imaging device, a mounting plate configured to fix a position of the imaging device and having an insertion hole formed in one area thereof, and a pivot joint connected to the stand cover and having a protrusion inserted into the insertion hole.

15 Claims, 4 Drawing Sheets

ROTATING MOUNT

CROSS-REFERENCE TO RELATED APPLICATION

This application claims priority under 35 U.S.C. §119 to Korean Application No. 10-2015-0180211, filed on Dec. 16, 2015, whose entire disclosure is herein incorporated by reference.

BACKGROUND

1. Field

The present disclosure relates to a rotatable mount.

2. Background

Generally, a monitoring and imaging apparatus may be an apparatus which is installed at a wall or a ceiling in order to prevent theft or accidents beforehand by monitoring entrants and continuously capturing and recording the movement of the entrants.

Such a monitoring and imaging apparatus includes a body in which a charged coupled device (CDD) for performing digital signal processing on an optical signal incident from a normal lens is embedded, a function adjusting unit including a group of lenses of an imaging device and combined with the body, and an imaging device signal processing unit for performing image signal processing on a digital signal passed through the imaging device and outputting an image signal. The function adjusting unit may include a focus adjusting device which may adjust a distance between the group of lenses and an imaging surface of the imaging device so as to capture a clear image of a normal subject. The focus adjusting device is adjusted according to an installation position and an installation place when the monitoring and imaging apparatus is installed, and forms a setting state of a focus required by the function adjustment.

Recently, with the increase of working parents, various types of small-sized monitoring and imaging apparatuses for monitoring children are being increased. The monitoring and imaging apparatus is set at a position of a wall or ceiling so as to capture an entire screen of a desired place to be captured. However, when the monitoring and imaging apparatus is installed on a wall as a fixed type, there is a problem in that a mount cannot be rotated and a focus may not be adjusted.

BRIEF DESCRIPTION OF THE DRAWINGS

The embodiments will be described in detail with reference to the following drawings in which like reference numerals refer to like elements wherein.

DETAILED DESCRIPTION

Figure 1:
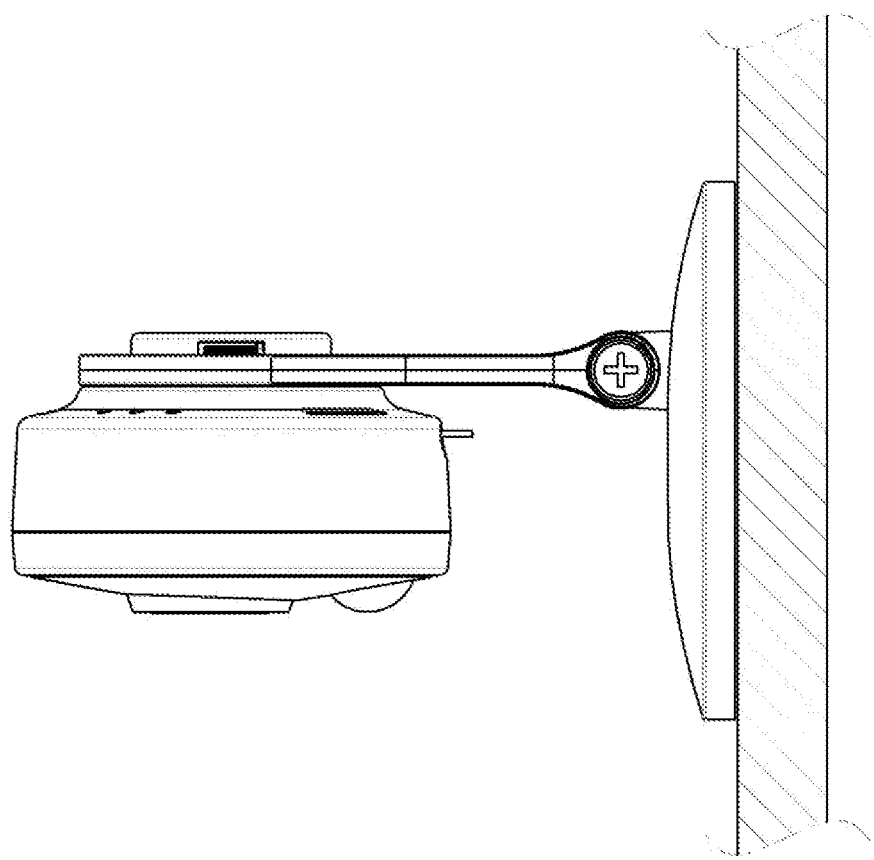
FIG. 1 is a view illustrating an overall configuration of a rotating mount according to an embodiment of the present disclosure.
Figure 2:
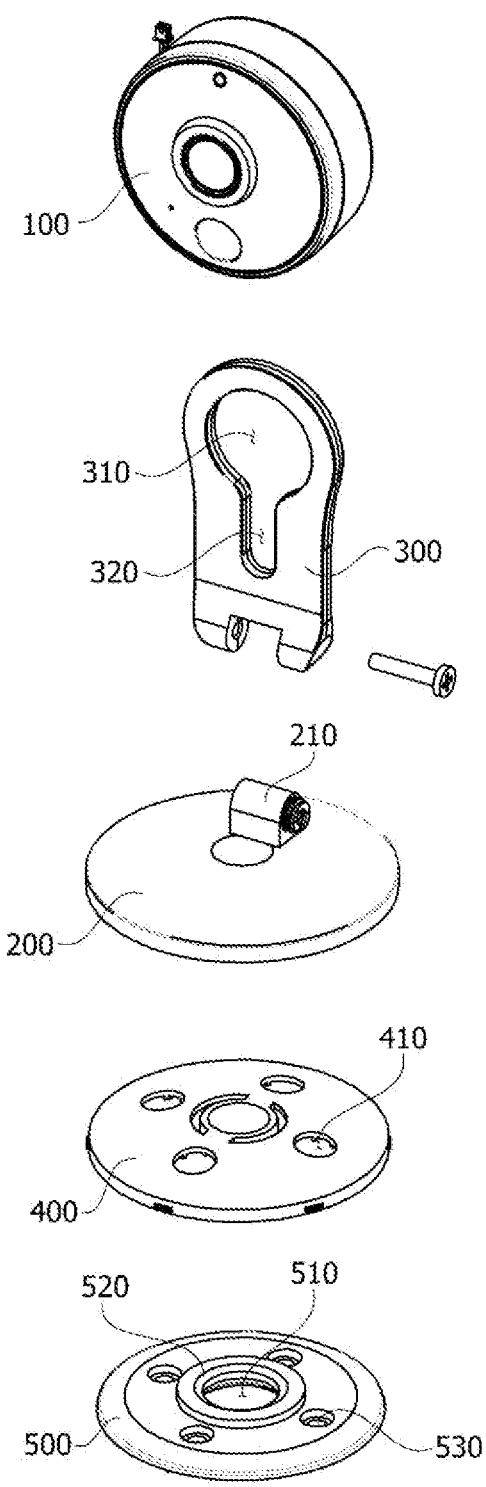
FIG. 2 is an exploded perspective view illustrating the rotating mount of FIG. 1 when viewed from a front surface thereof.
Figure 3:
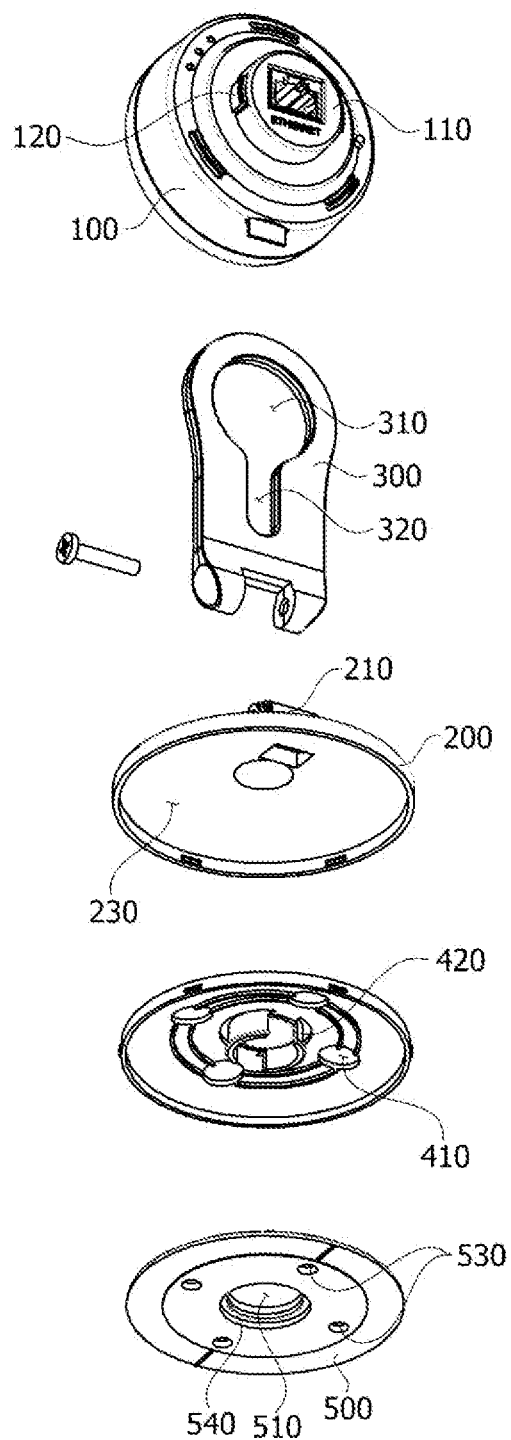
FIG. 3 is an exploded perspective view illustrating the rotating mount of FIG. 1 when viewed from a back surface thereof.

Referring to FIGS. 1 to 3, a rotating mount 1 according to an embodiment of the present disclosure may include an imaging device or a camera 100, a stand cover 200, a connecting unit or a connector 300, a fixing unit or a mounting plate 500, and a pivoting unit or a pivot joint 400.

The imaging device 100 is a device for capturing an image with no limitation on a type and a shape thereof. A video camera may be used as the imaging device 100. The imaging device 100 may be provided to have a cylindrical shape, and a lens for capturing an image may be provided at one side of the imaging device 100. Further, a protrusion 110 for fixing the connecting unit 300 may be provided in one area or one side of the imaging device 100.

The stand cover 200 may be connected to the imaging device 100 to fix the imaging device 100. The stand cover 200 may be provided to have a plate shape in order to stably support the imaging device 100 and may be connected to the pivoting unit 400 to adjust a capturing position of the imaging device 100. There is no limitation on the shape of the stand cover 200, and the stand cover 200 may be deformed in various shapes for stably supporting the imaging device 100.

In one embodiment, the stand cover 200 may be provided in a disc shape in order to stably support the imaging device 100, and an internal space 230 for accommodating the pivoting unit 400 may be formed on a lower surface of the stand cover 200. The stand cover 200 may be connected to the pivoting unit 400 and may rotate 360 degrees according to rotation of the pivoting unit 400. A cover protrusion 210 may be formed on an upper surface of the stand cover 200 and may be connected to the connecting unit 300.

The connecting unit 300 may have one side connected to the imaging device 100 and the other side connected to the stand cover 200, and may allow the imaging device 100 to capture an image in a state of being separated by a predetermined distance from the stand cover 200. This is to prevent a capturing range from being limited by capturing a wall or a floor to which the stand cover 200 is fixed when the imaging device 100 is directly connected to the stand cover 200. There may be no limitation on the shape of the connecting unit 300, and the connecting unit 300 may be deformed in various shapes for connecting the imaging device 100 to the stand cover 200 to be spaced apart from each other. Alternatively, the connecting unit may be flexible to allow bending in different orientation.

The connecting unit 300 may be provided to have a plate shape having a predetermined width, and one side of the connecting unit 300 may be connected to the imaging device 100 and the other side of the connecting unit 300 may be connected to the stand cover 200. A portion connected to the imaging device 100 may be fixedly combined in order to prevent the imaging device 100 from being moved. There may be no limitation on the method of fixedly combining the connecting unit 300, and various methods such as screwing and the like may be used.

In one embodiment, an imaging device insertion hole 310 into which the protrusion 110 formed in the imaging device 100 is inserted may be formed in the connecting unit 300, and a fastening unit 120 for preventing separation of the connecting unit 300 may be provided in the protrusion 110. A plurality of fastening units 120 are provided along an outer circumferential surface of the protrusion 110, and they are easily detachable through a hooked structure. The imaging device insertion hole 310 formed in the connecting unit 300 may be deformed according to a shape of the protrusion 110, and an extended hole 320 may be formed in a predetermined direction for easy fastening to the fastening unit 120 having a hooked structure.

The other side of the connecting unit 300 may be combined with the cover protrusion 210 formed on the upper surface of the stand cover 200. The other side of the connecting unit 300 may be connected to the cover protrusion 210 in an axial combination to have a pivoting structure. In one embodiment, a space into which the cover protrusion 210 is inserted may be formed in the connecting unit 300. The cover protrusion 210 is inserted thereinto and then is combined in an axial direction to rotate 180 degrees in forward and backward directions.

This allows the imaging device 100 to easily adjust its capturing position through a rotating structure of the pivoting unit 400 and a double rotating structure of the connecting unit 300. There may be no limitation on the combination method of the connecting unit 300, and various structures for rotating the connecting unit 300 in the forward and backward directions may be used. Further, the cover protrusion 210 may be located outside the center of the stand cover 200. This is to maintain a stable fixed state at the center of the imaging device 100 located at the center of the stand cover 200 when the cover protrusion 210 is combined with the stand cover 200.

The fixing unit 500 may fix the imaging device 100. The fixing unit 500 may have various shapes for fixing the imaging device 100, and a fixing method may be changed according to a fixed position. The fixing unit 500 may be provided to have a plate shape in order to stably support the imaging device 100, and an insertion hole 510 into which the rotating structure of the pivoting unit 400 is inserted may be formed in the fixing unit 500.

In one embodiment, the fixing unit 500 may be provided to have a circular shape to be fixed to a wall, and may be fixed in the circular shape to be stably supported against an external force in all directions. Further, a plurality of fixing holes 530 may be provided in the fixing unit 500 to ease combining by screwing. The fixing holes 530 may be formed at positions which are symmetrical to each other in order to stably combine the fixing unit 500.

The fixing unit 500 may be fixed at various positions such as a wall, a floor, a table, and the like, and the fixing unit 500 may be stably fixed at a position for supporting a load using a screw, a nail, or the like. Further, the fixing unit 500 may be detachably connected at a position of a table, a desk, or the like using Velcro or the like.

The pivoting unit 400 may be connected to the stand cover 200, and a rotating unit 420 inserted into the insertion hole 510 may be formed in the pivoting unit 400. The pivoting unit 400 may be connected to the stand cover 200 by being inserted into the internal space 230 formed in the stand cover 200, and the rotating unit 420 which protrudes in a downward direction may be provided under the pivoting unit 400.

The rotating unit 420 may be provided to have a protruding shape which protrudes in the downward direction, may be inserted into the insertion hole 510 formed in the fixing unit 500, and may rotate in a state of being fixed to the fixing unit 500 by a supporting unit 540 formed in the insertion hole 510. In one embodiment, the rotating unit 420 may have a hooked structure. The hooked structure has a structure in which facing areas at a center thereof are incised in a cylindrical shape and are movable while being inserted into the insertion hole 510. The hooked structure may pass through the insertion hole 510 and may be fixed by the supporting unit 540.

Further, in order to easily insert the hooked structure into the insertion hole 510 of the fixing unit 500, an inclined portion 520 may be formed. The inclined portion 520 may be formed at an entrance of the insertion hole 510 to have a slope, and thus the hooked structure may be easily fastened thereto.

A combined form or structure of the rotating unit 420 and the fixing unit 500 will be described again. A plurality of through-holes 410 may be formed in the pivoting unit 400. The plurality of through-holes 410 correspond to positions of the plurality of fixing holes 530 formed in the fixing unit 500. The through-holes 410 are for addressing an inconvenience of separating the fixing unit 500 from the pivoting unit 400 in order to fix the fixing unit 500 when the through-holes 410 are manufactured with the fixing unit 500 and are sold in a state of being combined with each other.

Figure 4:
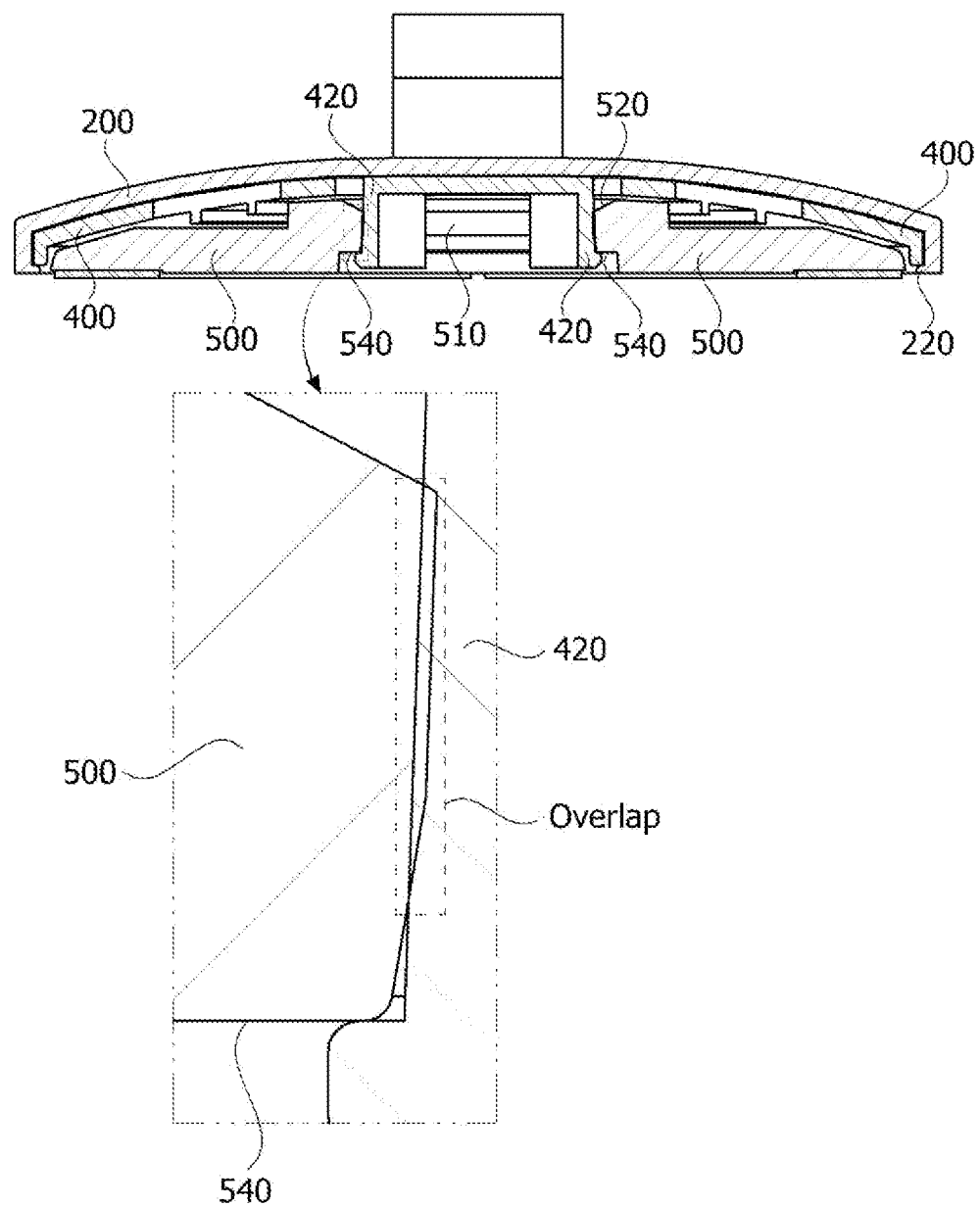
FIG. 4 is a cross-sectional view illustrating a combined state of the rotating mount of FIG. 1.

Referring to FIG. 4, in the rotating mount 1 according to the embodiment of the present disclosure, the pivoting unit 400 may be inserted into the stand cover 200 and may be connected thereto to have a structure in which the fixing unit 500 is inserted into the pivoting unit 400.

In this case, an engaging portion 220 for preventing separation of the pivoting unit 400 may be formed in the stand cover 200. The engaging portion 220 may be provided to protrude toward the internal space 230 formed in the stand cover 200. In one embodiment, the engaging portion 220 may be provided to have a plurality of protruding shapes or in a stepped shape to support the entire pivoting unit 400. Further, when the engaging portion 220 is provided to have a plurality of protruding shapes, protrusion insertion holes into which the protruding shapes are inserted may be formed on the pivoting unit 400 and may be combined with the protruding shapes. There may be no limitation on the shape of the engaging portion 220, and the engaging portion 220 may have various shapes for fixing the pivoting unit 400.

When the rotating unit 420 is provided in a hooked structure, the hooked structure has a structure in which the hooked structure passes through the insertion hole 510 along the inclined portion 520 formed in the insertion hole 510, expands when it reaches the supporting unit 540 formed inside the insertion hole 510, and is fixed by the supporting unit 540.

When the pivoting unit 400 is combined with the fixing unit 500, an inner diameter of the insertion hole 510 and an outer diameter of the rotating unit 420 may be designed to overlap. Although the rotating unit 420 has to be rotatably combined with the insertion hole 510, this is to prevent the rotating unit 420 from being rotated by the positioning of the imaging device 100 or the movement of the connecting unit 300. For example, an overlap width may be designed within a range of 0.05 mm to 0.1 mm, and a force ranging from 0.15 kgf to 0.3 kgf may be used when rotating the rotating unit 420. Through the overlapping design, a product supporting function and a convenience of adjustment by a user may be improved.

According to the embodiment, a capturing position of an imaging device can be easily adjusted by using a rotating structure. Further, when there is a problem in the imaging device, the imaging device can be easily repaired by being combined in an easily detachable structure.

The present disclosure is directed to a rotating mount which pivots to adjust a focus. The present disclosure is also directed to a rotating mount which eases detaching an imaging device when there is a problem in the imaging device. Further, the present disclosure is directed to a rotating mount which includes a rotating structure to easily adjust a capturing position of an imaging device.

According to an aspect of the present disclosure, there is provided a rotating mount including an imaging device, a stand cover connected to the imaging device, a fixing unit configured to fix a position of the imaging device and having an insertion hole formed in one area thereof, and a pivoting unit connected to the stand cover and having a rotating unit inserted into the insertion hole.

A supporting unit for preventing separation of the rotating unit may be formed in the insertion hole. The rotating unit may have a hooked structure. A plurality of through-holes configured to easily fix the fixing unit may be formed in the pivoting unit. An inclined portion may be formed at an entrance of the insertion hole.

The stand cover may include an internal space configured to accommodate the pivoting unit. The stand cover may include an engaging portion for preventing separation of the pivoting unit. The engaging portion may protrude inside the stand cover and fix the pivoting unit. An inner diameter of the insertion hole may overlap an outer diameter of the rotating unit.

The rotating mount may further include a connecting unit configured to connect the imaging device to the stand cover, and the connecting unit and the stand cover may be connected to pivot. The connecting unit and the stand cover may be connected in an axial combination. The connecting unit may be connected at a position spaced apart from a center of the stand cover.

An imaging device insertion hole into which a protrusion provided in the imaging device is inserted may be formed at one side of the connecting unit, and a plurality of fastening units for preventing separation of the imaging device may be provided on an outer circumferential surface of the protrusion. An extended hole may be formed in the imaging device insertion hole. The stand cover may include a cover protrusion and may be connected to the connecting unit, and the cover protrusion may be located outside the center of the stand cover.

It should be understood that, although the terms "first," "second," etc. may be used herein to describe various elements, these elements are not to be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In an embodiment, when an element is referred to as being formed "on" or "under" another element, the description includes the meaning of the two elements being in direct contact with each or the element could be indirectly on or under the other element by one or more elements being interposed therebetween. Further, when an element is referred to as being formed "on" or "under" another element, the description may include the meaning of "formed in an upper direction of the element" and "formed in a lower direction of the element."

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rotatable mount comprising:
an imaging device;
a stand cover connected to the imaging device;
a fastening plate configured to fix a position of the rotatable mount and having an insertion hole formed in one area thereof; and
a pivot joint connected to the stand cover and having a protrusion inserted into the insertion hole, the protrusion being rotatable inside the insertion hole.

2. The mount of claim 1, wherein a ledge for preventing separation of the protrusion is formed in the insertion hole.

3. The mount of claim 1, wherein the protrusion has a hooked structure.

4. The mount of claim 1, wherein a plurality of through-holes configured to fix the fastening plate are formed in the pivot joint.

5. The mount of claim 3, wherein an inclined portion is formed at an entrance of the insertion hole.

6. The mount of claim 1, wherein the stand cover includes an internal space configured to accommodate the pivot joint.

7. The mount of claim 6, wherein the stand cover includes an engaging tab for preventing separation from the pivot joint.

8. The mount of claim 7, wherein the engaging tab protrudes inside the stand cover and fixes the stand cover to the pivot joint.

9. The mount of claim 1, wherein an inner diameter of the insertion hole is smaller than an outer diameter of the protrusion.

10. The mount of claim 1, further comprising a connector configured to connect the imaging device to the stand cover such that the connector pivots with the stand cover.

11. The mount of claim 10, wherein the connector and the stand cover are connected in an axial combination.

12. The mount of claim 11, wherein the connector is connected at a position spaced apart from a center of the stand cover.

13. The mount of claim 10, wherein an imaging device insertion hole into which a protrusion provided in the imaging device is inserted is formed at one side of the connector, and a plurality of fastening clips for preventing separation of the imaging device are provided on an outer circumferential surface of the protrusion.

14. The mount of claim 13, wherein an extended hole is formed in the imaging device insertion hole.

15. The mount of claim 12, wherein the stand cover includes a cover protrusion and is connected to the connecting unit, and the cover protrusion is located outside the center of the stand cover.

* * * * *